US006239573B1

(12) United States Patent
Schmall

(10) Patent No.: US 6,239,573 B1
(45) Date of Patent: May 29, 2001

(54) LINEAR FEED DRIVE SYSTEM WITH INTEGRATED WEIGHT RELIEF FOR POSITIONING TOOLS IN RELATION TO A WORKPIECE

(76) Inventor: Karl Heinz Schmall, Waldstr. 20, D-76532 Baden-Baden (DE)

( * ) Notice: Subject to any disclaimer, the term of this patent is extended or adjusted under 35 U.S.C. 154(b) by 0 days.

(21) Appl. No.: 09/425,690

(22) Filed: Oct. 22, 1999

(30) Foreign Application Priority Data

Oct. 27, 1998 (DE) .............................................. 198 49 384

(51) Int. Cl.[7] .................................................. G05B 19/04
(52) U.S. Cl. ...................................... 318/687; 318/568.21
(58) Field of Search ......................... 318/568.11, 568.16, 318/568.21, 687

(56) References Cited

U.S. PATENT DOCUMENTS

| | | | |
|---|---|---|---|
| 3,481,247 | * 12/1969 | Hayes ........................................ | 90/11 |
| 3,555,962 | * 1/1971 | Wolf et al. ................................ | 90/11 |
| 3,809,308 | * 5/1974 | Roeder et al. ........................... | 228/9 |
| 4,013,277 | * 3/1977 | Schmitt .................................... | 266/76 |
| 4,131,965 | * 1/1979 | Von den Benken et al. ........ | 12/86.7 |
| 4,284,871 | * 8/1981 | Mawson et al. ............... | 219/121 PV |
| 4,415,795 | * 11/1983 | Ross et al. ........................ | 219/121 H |
| 4,773,946 | * 9/1988 | Griebeler ............................. | 148/9 R |
| 4,872,362 | * 10/1989 | Kemper et al. ......................... | 74/479 |
| 5,328,303 | * 7/1994 | Jang ........................................ | 408/14 |
| 5,989,485 | * 11/1999 | Staacks et al. .......................... | 266/76 |

FOREIGN PATENT DOCUMENTS 28 48 957   8/1985   (DE) .

* cited by examiner

Primary Examiner—Robert E. Nappi
Assistant Examiner—Rina I. Duda
(74) Attorney, Agent, or Firm—Collard & Roe, PC

(57) ABSTRACT

The invention relates to a linear feed drive system for working tools with an integrated tactile sensor system for initial positioning processes on the workpiece before the working process is started, and with integrated weight relief. The system comprises at least two parallel guided elements disposed directly next to each other and displaceable against one another in the feed direction. One element is directly connected with the drive of the system, and the other element is connected with the driven tool, so that the possible distance of displacement of the elements relative to one another is limited within a defined range by the action of a force such as the weight of the two linear elements, by the force of a spring, or by a counterweight, in a defined position in said path. The force acts on the linear element supporting the tool against the direction of feed, and the element is displaceable relative to the driven linear element over a limited distance of displacement. There are electric signaling devices for converting the distance of displacement or a defined position over the distance of displacement into electric signals. There is also an adjustable source of force such as a spring between the two linear elements and acting in the direction of the path of displacement, for compensating the force of the weight of the tool and of the linear element supporting the tool.

15 Claims, 5 Drawing Sheets

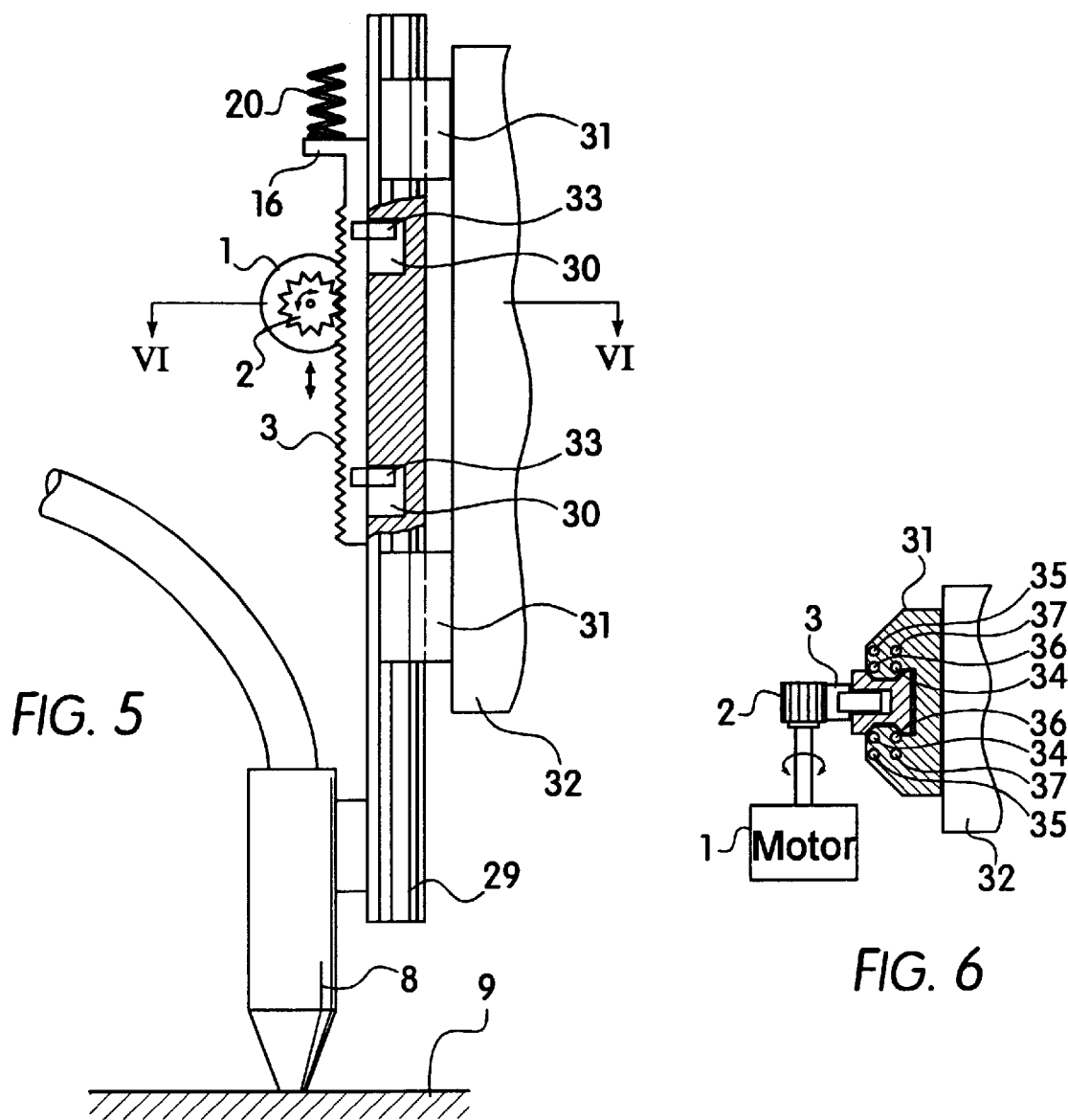
FIG. 5
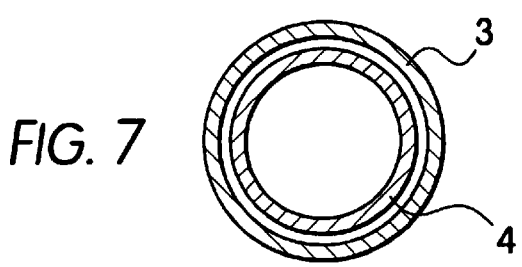
FIG. 6
FIG. 7

LINEAR FEED DRIVE SYSTEM WITH INTEGRATED WEIGHT RELIEF FOR POSITIONING TOOLS IN RELATION TO A WORKPIECE

BACKGROUND OF THE INVENTION

1. Field of the Invention

This invention relates to a linear feed drive system for working tools, having an integrated tactile sensor system for initially positioning the tool in relation to the workpiece before the working process is started. The linear feed drive system also has an integrated weight relief.

2. The Prior Art

Mechanical, hydraulic or electric motor-driven feed drives for linear tool movements are known in the art. The function of such feed drives is to drive a working tool such as a welding torch or a spray nozzle for coating work in the direction of a workpiece, and then to guide the tool during the working process at a spacing from the workpiece that is optimal for the given working process. Controlling systems are employed for such controlled guidance in known ways. The control systems maintain the spacing desired between the tool and the workpiece via sensors that are sensitive to the spacing between the working tool and the workpiece.

In many cases, available spacing sensors are used for driving the tool from its starting position into a position spaced from the workpiece for the start of the working process. An example of such sensors are capacitive or inductive, contactlessly operating spacing sensor systems employed in thermal welding and torch cutting processes, as well as in connecting processes such as the riveting of structural components of motor vehicles. In these systems, a capacitive sensor electrode or an inductive sensor coil is connected via an electronic system with the drive of the tool so that it follows the motion of the tool from its starting position to the metallic workpiece.

The output signal of the sensor system, which is connected downstream of the capacitive electrode or inductive sensor coil, changes as the workpiece is approached. When approaching a defined adjustable nominal spacing, the feed drive is increasingly slowed down by the signal, which generally is an analog signal dependent upon the spacing, and the feed drive is then shut off under normal conditions after the nominal spacing has been reached. The tool, for example a welding or cutting torch or a rivet driving and setting tool, is subsequently driven into the defined working position. The working process starts thereafter.

However, when such capacitive or inductive sensor systems are used, the contactlessly operating sensors have a defined surface area or size, and only supply accurate voltages analog to the spacing if they face plane metallic areas on the surface of the workpiece having at least the same size. This makes it impossible to exactly position the working tool on the edges of the workpiece, or on small surfaces of the workpiece. The same problem also prevents exactly spaced guidance of the workpiece in the course of the working process if the workpiece has to be guided near material edges, or on narrowly shaped workpieces.

In most cases, particularly when metal workpieces are welded and cut, the tools are tubular or have the form of wire or nozzles, and their dimensions are very small compared to the workpieces. Therefore, the tool itself should be employed as a tactile sensor so that an exact initial position can be found on the edges and small areas of a workpiece before the working process is started. Systems are known in which the tool is slowly advanced by the linear feed drive device in the direction of the workpiece until the metallic tip of the tool, for example a torch nozzle, touches the workpiece and thereby establishes a galvanic contact between the two, which permits generating an electric switching signal to thus shut down the drive. The drawback of such systems is that the feed rate has to be greatly reduced until the tool comes into contact with the workpiece, so that the sensitive front side of the tool, e.g. a cutting nozzle, will not suffer any damage. The force generated when the tool is placed on the workpiece conforms to the following rule:

$$F = m \times a \text{(mass} \times \text{acceleration)}$$

With such feed drives, the mass acting when the tool is placed on the workpiece comprises the total mass in motion in this process, i.e., the mass of the drive motor, the mass of the linear drive and the mass of the tool, in each case based on the nozzle as the tactile sensor. In order to keep force "F" within the permissible limits, acceleration "a" has to be as low as possible.

Controlled feed drives should be as "stiff" as possible in order to keep delay times and mechanical hysteresis to a minimum. In such systems, if the "touchdown" force of the nozzle must not exceed a defined measure, the feed rate must be very low to keep the "shutdown" acceleration within limits. This requirement, however, means a substantial loss of time in the operating cycle of the machine.

In another known system, the rise in the current of the feed drive motor as the tool is put into place against the workpiece due to the higher torque as touchdown force "F" is being generated is used. Systems of this type exhibit the substantial drawback that the entire moments of inertia of the feed in this process have effects reaching into the shut-off process. In addition, sensitive interpretation of the current rise in the motor circuit is not possible because it is. necessary to rapidly control the drive in the controlled state with correspondingly rapid and intensive current increases. Consequently, low feed rates have to be employed in this case, and correspondingly high loss times in the operating cycle are unavoidable.

SUMMARY OF THE INVENTION

It is therefore an object of the invention to avoid these drawbacks and to provide a linear feed drive system for working tools with an integrated tactile sensor system for initial positioning processes on the workpiece prior to the start of the working process.

It is another object of the invention to provide a linear feed drive system that has an integrated weight relief, which offers significant advantages in the adjustment of the tool by virtue of its special structure.

These and other objects of the invention are accomplished by a linear feed drive system for working tools with an integrated tactile sensor system for initial positioning processes on the workpiece before the working process is started. The system has an integrated weight relief as well. There are at least two parallel linear guide elements disposed directly next to each other and displaceable against each other in the direction of the feed. One guide element is directly connected with the drive of the system, and the other guide element is connected with the driven tool. This way, the possible distance of displacement of these elements relative to each other is limited in a defined position within a defined range by the action of a force, for example by the weight of the two linear elements, by the force of a spring, or by a counterweight. Under a force acting against the direction of feed of the linear element supporting the tool, the linear element supporting the tool can be displaced relative to the driven linear element over a limited distance of displacement. There are electric signaling devices converting the distance of displacement or a defined position in the path of displacement into electric signals. There is also a source of force in the form of a spring adjustable between the two linear elements. The force acts in the direction of the path of displacement and compensates for the weight of the tool and the linear element supporting the tool.

This linear feed drive system has the substantial advantage that the linear guidance system consists of two elements that are displaceable against each other, with one element directly connected to the drive motor. The other element is displaceably supported versus the first-mentioned element and has a low inertia mass. The second element, which is linearly displaceable, supports the tool via a suitable tool holder. The first linear element, which is connected with the drive motor and gearing, is connected by a spring to the second linear guide element supporting the tool. In the normal case of feed, the two linear elements are not displaced against one another in their guides. However, as soon as the element supporting the tool is inhibited in its linear movement, it shifts against the spring force versus the driven element.

This condition occurs when the tool sets down on the workpiece. As a result of the low moments of inertia of the guide element supporting the tool, which is then set still, only a correspondingly low "touchdown" force "F" occurs on the tool. The tool is thus treated with the best possible care. The high moments of inertia of the motor and the other components of the linear drive, namely the transmission and the driven element, are eliminated as the motor connected downstream comes to a standstill, and have no effect on "touchdown" force "F".

The guide elements are preferably rail-shaped, tubular or round linear guide elements that are guided between rollers. The drive is an electric motor having a gearing for translating the rotational motion into a linear movement. The signaling devices are distance function emitters or switches.

The driven linear element could also be a toothed rack resting displaceably against the other linear element that supports the tool. The driven element is preferably driven by a spindle-and-nut system. The nut directly abuts the linear element supporting the tool or rests against the element via a rail attached thereto.

The driven linear element could also be driven by a cable pulley block gear or belt pulley block gear on the gearing or motor. In this case, the driven linear element is arranged directly on the linear element supporting the tool.

In another embodiment, there is a slide bearing arranged between the driven linear element and the element supporting the tool. Alternatively, there is a ball- or roller supported guide arranged between the driven linear element and the element supporting the tool.

The linear path of movement of the element supporting the tool represents the full distance of feed of the system, and the driven element can be displaced relative to the element supporting the tool over a partial distance. There is at least one mechanical stop means to limit the distance. The stop means represents the reference position of the two elements next to each other.

In another embodiment of the invention, the linear elements are bar-shaped and the element supporting the tool is guided by ball circulation carriages or roller bearings. In another embodiment, the linear elements are concentrically arranged tubes.

Preferably, a pressure spring is arranged between the two linear elements in the direction of the path of displacement. The pressure spring can be adjusted by a device such as a threaded bar so that the force applied by the spring to one element relative to the other element is variable along the path of displacement. The spring force relieves the forces generated by the weight of the tool and the element supporting the tool. The variable range of the spring force is dimensioned so that in the presence of vertically acting forces of mass, the weight of the tool, its feed lines and the linear element are fully compensated.

After an exactly determined displacement between the linear driving element and the linear guide element supporting the tool occurs, an electric signal is generated, which shuts down the motor drive. This is accomplished by an analog signal based on the distance in the displacement of the two linear elements, which is generated by actuating a linear potentiometer, or a rotational potentiometer driven via a toothed rack or a cable drive. The position of such a potentiometer and thus its output voltage corresponds with the relative displacement of the two linear elements against one another. This output voltage is fed into the control circuit for slowing down and setting the drive motor to zero, so that the motor comes to a standstill when the two linear elements have traveled a defined distance of displacement.

To generate the distance-dependent electric signal, a distance pulse emitter is used, which converts the relative distance of displacement of the linear elements into incremental pulses. The rotational speed of the motor is shut off in the known way via digital signal processing of the motor drive system.

There is a switch mounted on the invention, which generates a shutdown signal for switching off the motor drive. Following a defined minor displacement of the two linear elements against each other, a contactless electronic or contact-making mechanical position switch is actuated, whose switching hysteresis is very low. The switching signal shuts down the motor drive, which subsequently comes to a standstill over period of time depending on the intensity of the braking action within the range of the relative distance of displacement.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 5 shows a side view of another embodiment of the device;

FIG. 6 shows a detail along lines VI—VI of FIG. 5; and

FIG. 7 shows a cross-sectional view of an alternative embodiment of the linear elements of the device according to the invention.

DETAILED DESCRIPTION OF THE PREFERRED EMBODIMENT

Figure 1:
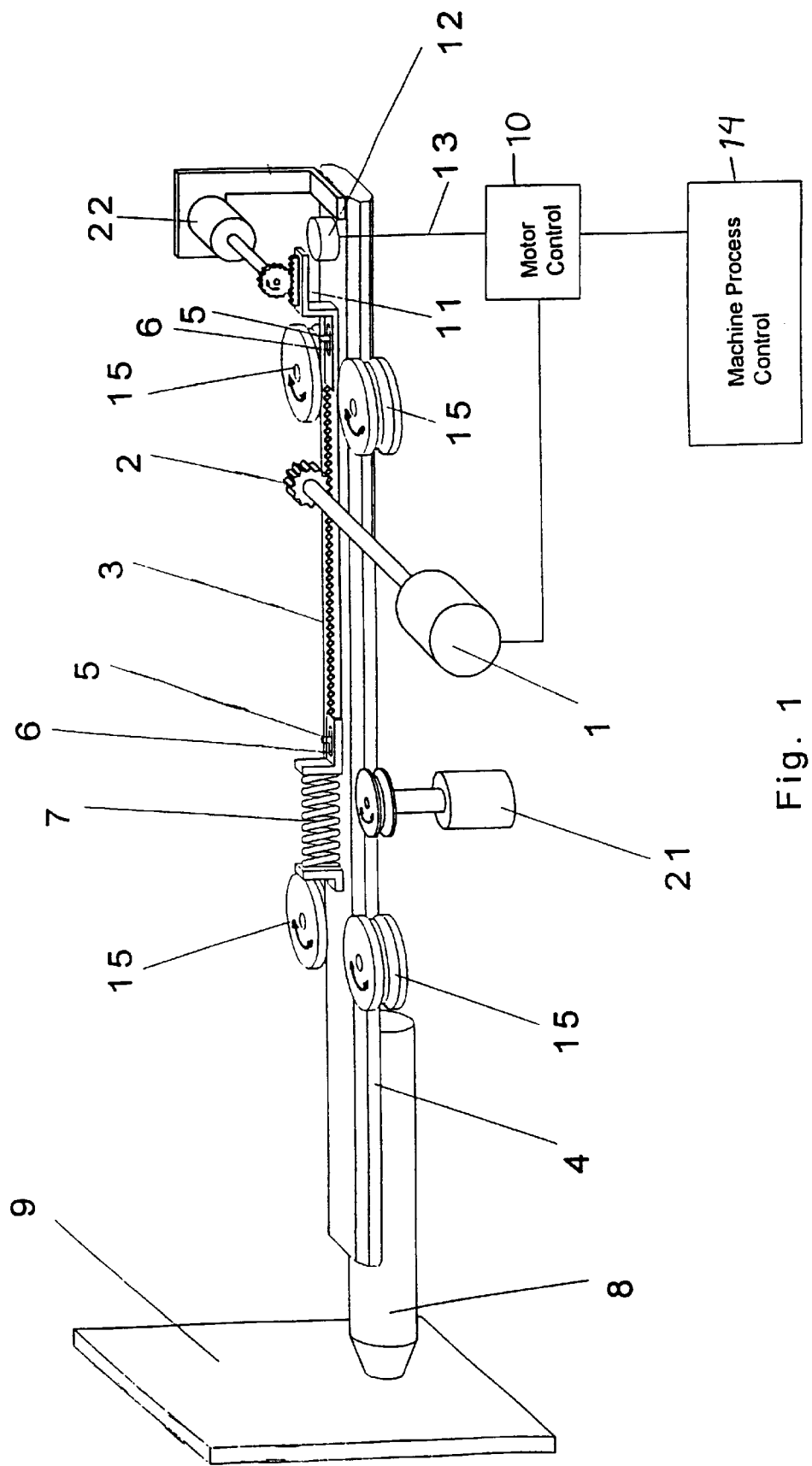
FIG. 1 shows a perspective view of the basic structure and the underlying principle of the linear feed drive system as defined by the invention on the example of a pinion-and-toothed rack drive gear.

Referring now in detail to the drawings, FIG. 1 shows that the feed drive system according to the invention consists of an electric motor drive 1 having a driving pinion 2 engaging a toothed rack 3 as the driven element. Toothed rack 3 guides the tool 8, and is displaceably supported by guide slots 5 and guide pins 6. Toothed rack 3 is displaceable versus carriage guide 4. This means that toothed rack 3 is capable of displacing itself versus carriage guide 4 against the pressure of spring 7 parallel with carriage guide 4 against workpiece 9. The guide rollers of carriage guide 4 are denoted by reference numeral 15. The plane in which the guide rollers are mounted is not shown in detail for reasons of clarity.

Motor 1 is activated via the motor control 10. A metallic switching tab 11 is attached to toothed rack 3. When toothed rack 3 is displaced on carriage guide 4, tab 11 is jointly displaced in relation to guide 4 and activates the electronic, contactless switch 12 after a certain position has been reached in the path of displacement. The switching signal of switch 12 is transmitted to motor control 10 via the connection 13, and the motor is switched off in the controller, and the further process sequences are initiated. Furthermore, motor control 10 is connected to the general machine process control 14.

Instead of using switching tab 11 and switch 12, it is possible to employ a potentiometer or an angular step generator 22, which converts the relative motion between the two linear elements into electric signals for generating the switching signal. Such a distance measuring system for the entire distance of displacement is denoted in FIG. 1 by reference numeral 21.

In a modified embodiment, instead of the carriage guidance with guide rollers 15, a ball circulation carriage guidance system can be used, in which the guide track is fixed and the linear guide elements are carriages supported by ball bearings running along the track, as shown in FIG. 5.

Also, a ball-bearing cage guide or a round ball guide can be employed, where the linear guide element is a cylindrical body. In other embodiments, the driven elements may be arranged concentrically relative to the tool-supporting elements, as shown in FIG. 7, where they are concentric tubes.

In the system shown in FIG. 1, the feed can be realized by a linear motor (not shown) without changing the function of the system as defined by the invention.

During the vertical movement of both elements, the linear element 4 supporting the tool is additionally loaded in the direction of gravity and thus downwardly by the weight of tool 8 and any lines or cables required for supplying the tool with the means required for the working process, such as gas, water, power, and coating materials.

Figure 2:
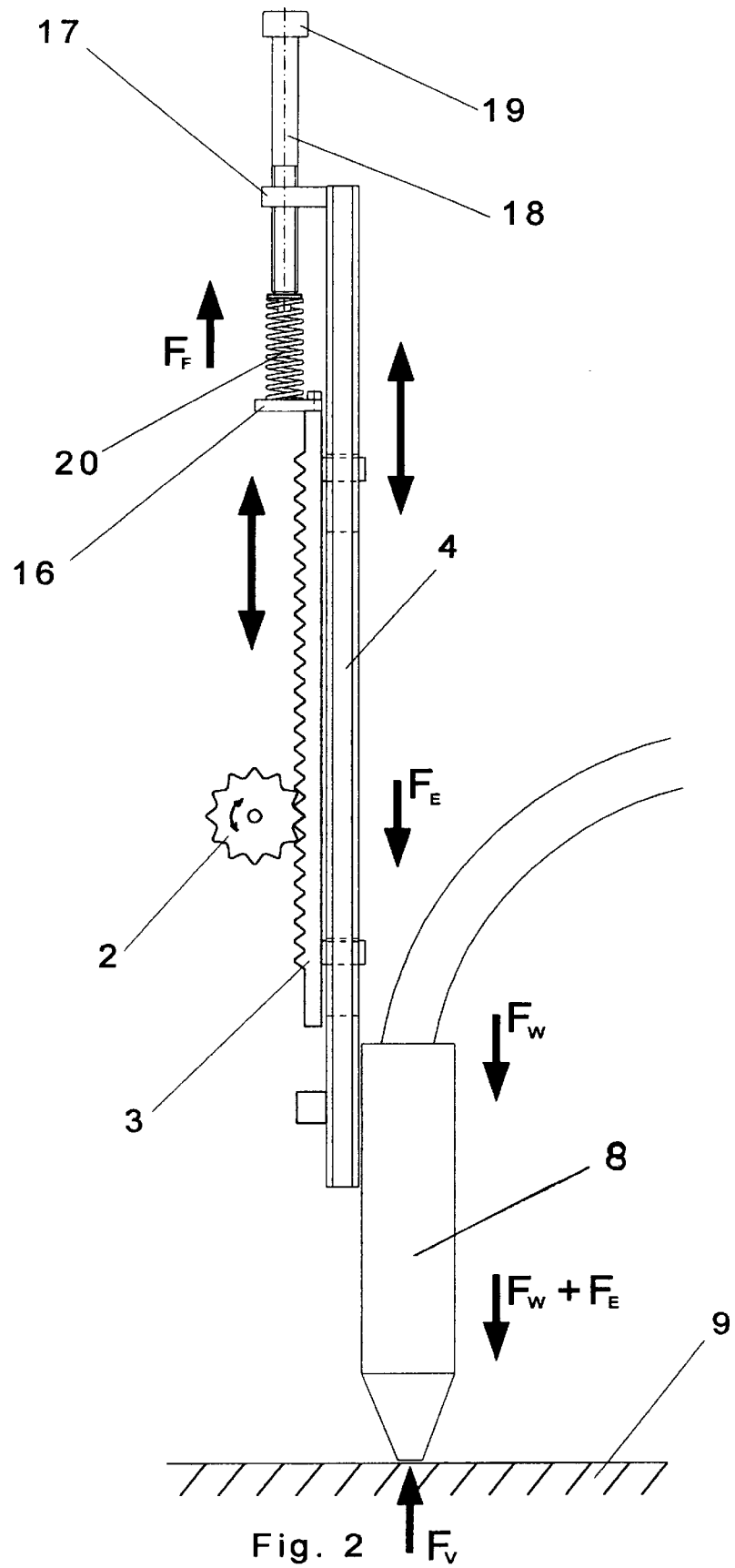
FIG. 2 shows a basic representation of another embodiment of the system as defined by the invention.

In order to obtain "touchdown" force "F" as low as possible when tool 8 touches down on workpiece 9, there is a a device for compensating the additional weight by the tool and its feed. This arrangement is shown in FIG. 2. Carriage guide 4, which supports tool 8, slides versus toothed rack 3, which is driven by pinion 2. A plate 16 is mounted on the end of toothed rack 3. A plate 17 is located in the same plane on element 4 and is provided with a thread. The threaded bar 18 can be vertically adjusted via the thread by rotary knob 19 and is connected with a pressure spring 20.

Weight $F_W$ of tool 8 and weight $F_E$ of the element supporting the tool (carriage guide 4) jointly cause the element supporting the tool to be pulled down when spring 20 is not tensioned, and to act as the stop means in the path of displacement over the distance between toothed rack 3 and carriage guide 4, resting against the path.

As soon as the pressure spring 20 is increasingly loaded by turning the threaded spindle 18 by rotary knob 19, the weight is relieved in the amount of spring force $F_F$ between the two linear elements. Complete weight relief is obtained when $F_F = F_W + F_E$. The force $F_V$ still to be expended for slowly displacing the two linear elements against one another becomes a minimum and is at the level of the frictional force between the two elements that has to be overcome for the displacement.

The expansion of the system as defined by the invention shown in FIG. 2 has important advantages over other tactile or contact-making systems for finding the starting position of a tool on the surface of the workpiece. This is especially true if the workpiece is not a solid or rigid body but consists of a soft or thin material such as plastic or metal sheet material because the summation force $F_W + F_E$ will cause the position of the workpiece to change in the direction of the summation force as the tool touches down on the workpiece. The position of the tool reached by displacement of the linear elements against each other when the switching signal is triggered will then no longer exactly correspond with the desired reference position of the unloaded surface of the workpiece, so that the working position of the tool, which is dependent upon such reference position, will be erroneous. The position error will increase the more the workpiece yields when the tool is touching down and, therefore, grows with the amount of summation force $F_W + F_E$ unless relief occurs through spring force $F_F$. However, if spring force $F_F$ is adjusted so that summation force $F_W + F_E$ is fully compensated, deformation of the workpiece and thus the position error are reduced to a minimum.

After the motor drive has been shut down either in a defined position of displacement in connection with the first-mentioned design of the analog or incremental feed path measurement, or in the undefined final or end position of the motor when it is switched off by a digital switching signal, the drive motor is activated again according to the invention in the opposite sense of rotation, so that the relative displacement of the two linear elements is reduced until both elements have returned to their original positions or the digital switching signal is reset.

Figure 3:
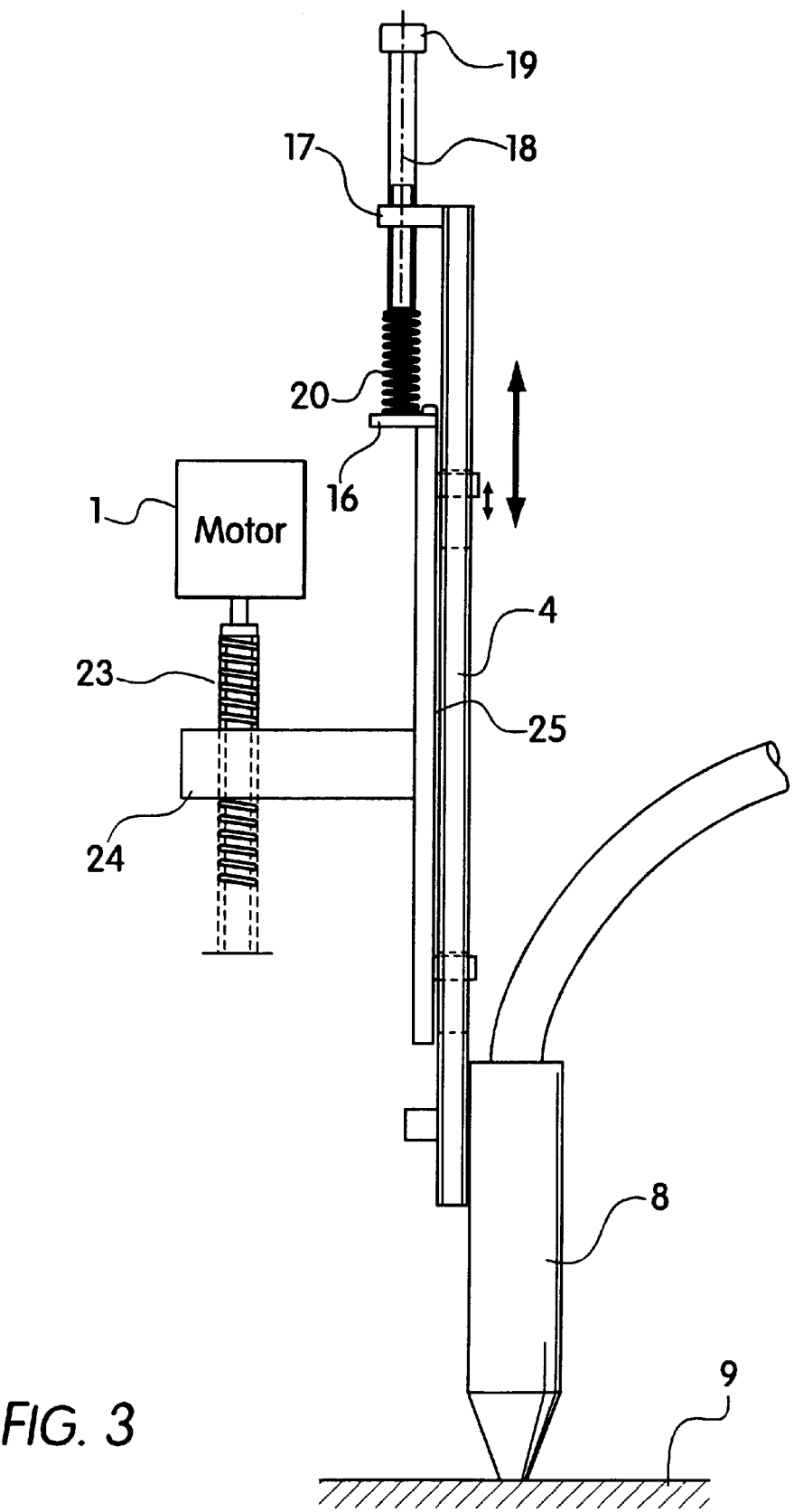
FIG. 3 shows a side view of the device of FIG. 2 with a worm drive.
Figure 4:
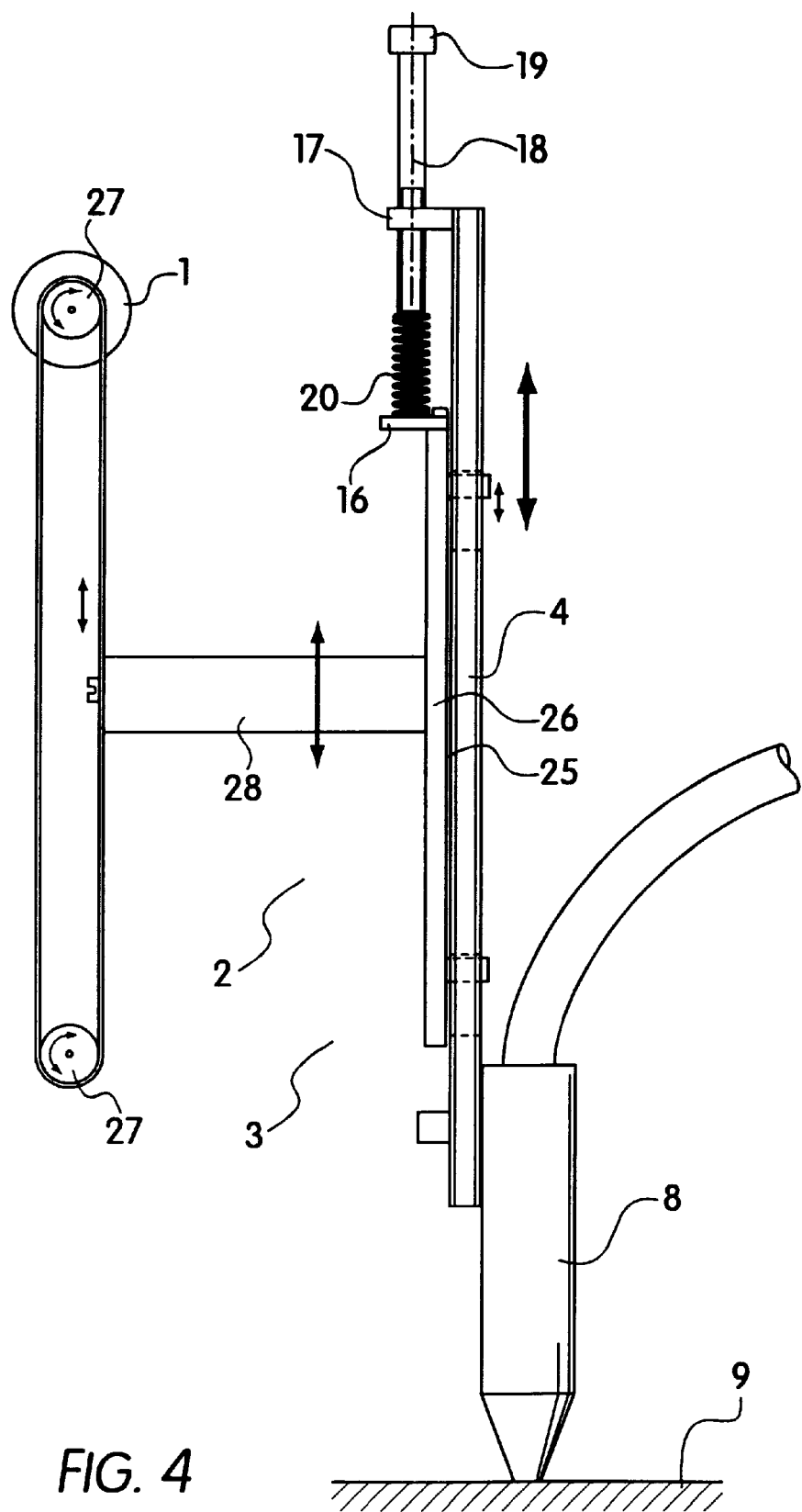
FIG. 4 shows a side view of the device of FIG. 2 having a belt drive.

As shown in FIG. 3, the drive can be a spindle and nut system having a spindle 23 held by a nut 24. Nut 24 abuts element 4. As shown in FIG. 4, the drive could also be a belt drive 27 having a pulley block gear 28 abutting element 4. As shown in FIGS. 3 and 4, a slide bearing 25 is arranged between elements 3 and 4.

FIGS. 5 and 6 show another embodiment of the system in which elements 3 and 4 are designed bar shaped and in which a slide bar 29 is positioned between elements 3 and 4. There is a slot 30 in slide bar 29 for a guide pin. A slide bearing 31 is mounted on the slide bar. A guide pin 33 connects element 3 with slide bar 29. There are bal bearings 34–37 mounted in slide bearing 31 to allow slide bar 29 to slide easily with respect to slide bearing 31.

In the two first-mentioned embodiments, the motor drive can be directly gradually driven again to zero so that the position of the driven element then reached will exactly correspond with the position of the tool at the moment of touchdown on the workpiece. In the exemplified embodiment comprising a position switch, there remains a minor defined residual distance between the position at the moment of resetting of the signal, and the position at the moment of touchdown of the tool on the workpiece.

The linear feed drive system as defined by the invention is additionally equipped with an electronic distance measuring system 21 for measuring the entire distance of displacement of the linear element supporting the tool. An analog absolute potentiometer distance measuring system, or an incremental or absolute digital pulse or multiple signal distance measuring system can be used for this purpose.

The distance measuring system 21 is employed in order to adjust the exact working position of the tool on the workpiece after finding the initial or starting position, which is accomplished by the tool touching the workpiece. Through the mechanical coupling of the distance measuring system with the linear element supporting the tool, the system recognizes at any time the exact position of the linear feed drive with respect to the initial reference position. This is signalized by driving against a limit switch in the starting position of the feed drive. As soon as the subsequent finding of the starting position has been completed, its position is transmitted by the distance measuring system 21 to the feed drive control 10 in the known manner as the further reference position for the starting position.

By inputting a position change value based on the reference position by the machine control in the known way, the feed drive is now driven into the new position characterized by this value, which corresponds with the next working position of the tool. Sensor systems are employed in plasma torch cutting installations for the spacing sensor system of the control circuit, which interpret the spacing-dependent arc voltage as the actual value of the spacing. This method offers the advantage that the arc itself, thus the exact distance between the plasma electrode and the workpiece, is used as the sensor source, so that even small workpiece surfaces and working directly on the edges of a workpiece will not cause any change in the signals of the sensor system. It is therefore possible to maintain the desired spacing between the electrode nozzle under such circumstances as well.

With such sensor systems depending on the arc voltage, it is important that the initial spacing between the electrode/nozzle and the workpiece be exactly positioned because with certain modes of operation, the arc voltage governing the control of the spacing has to be determined first on the basis of the reference positions, or intermediate positions dependant on the reference positions, before the voltage can be preset in the control process as the guiding quantity.

Tactile finding of the surface position on a workpiece can be employed with other sensor systems such as capacitive, inductive, electrooptical or electroacoustic sensors, where it is important that an exact starting position be reached independently of the sensor systems.

Accordingly, while only a few embodiments of the present invention have been shown and described, it is obvious that many changes and modifications may be made thereunto without departing from the spirit and scope of the invention.

What is claimed is:

1. A linear feed drive system with an integrated tactile sensor system for initial positioning on a workpiece before the working process is started, comprising:
    a working tool;
    a directly attached motor propelled feed drive for driving the tool in a feed direction;
    at least two parallel linear guide elements disposed next to each other and displaceable against each other in a feed direction, one of said guide elements being connected with the drive, and the other guide element with the working tool, wherein the displacement of said guide elements relative to each other is limited in a defined position within a defined range by a force acting against the direction of feed and comprising one of the weight of the two linear elements, a spring force and a counterweight;
    at least one electric signaling device for converting one of the measured displacement and position of the linear guide elements into electric signals, wherein upon contact of the tool with the workpiece said electric signals shut down the drive; and
    a spring connected between the two linear guide elements, said spring acting in the direction of displacement of the guide elements and compensating for the weight of the tool and the linear element supporting the tool, to reduce contact force between the tool and the workpiece when the tool contacts the workpiece.

2. The system according to claim 1, wherein the guide elements are of a shape selected from the group consisting of rail-shaped, tubular and round linear guide elements, and wherein the guide elements are guided between rollers.

3. The system according to claim 1, wherein the drive comprises an electric motor with a gearing for translating rotational motion into a linear movement, and wherein the signaling devices are selected from the group consisting of distance function generators and switches.

4. The system according to claim 1, wherein the linear guide element connected to the drive comprises a toothed rack resting against the element supporting the tool.

5. The system according to claim 1, wherein the element connected to the drive is driven by a spindle-and-nut system, and wherein the nut directly abuts the element supporting the tool.

6. The system according to claim 3, wherein the linear element connected to the drive is driven by a pulley block gear on one of the gearing and motor, and wherein said pulley block gear is displaceably arranged directly on the element supporting the tool.

7. The system according to claim 1, further comprising a slide bearing arranged between the element connected to the drive and the element supporting the tool.

8. The system according to claim 1, further comprising a guide supported on one of balls and rollers arranged between the element connected to the drive and the element supporting the tool.

9. The system according to claim 1, wherein the displacement of the element supporting the tool represents a full feed distance of the system, and wherein the element connected to the drive is displaced relative to the element supporting the tool over a part of said distance, and wherein there is at least one mechanical stop for limiting the displacement of the tool connected to the drive, said stop representing a reference position of the two elements relative to each other.

10. The system according to claim 1, wherein the linear elements are bar-shaped, and wherein the element supporting the tool is guided by elements selected from the group consisting of ball circulation carriages and roller bearings.

11. The system according to claim 1, wherein the linear elements are concentrically arranged tubes.

12. The system according to claim 1, wherein the spring is a pressure spring arranged between the two linear elements in the direction of the path of displacement, said pressure spring being adjustable by a manually actuated threaded bar so that the force applied by said spring to one element relative to the other element is variable along the path of displacement, and wherein said spring force relieves forces generated by the weight of the tool and the element supporting the tool; and wherein the variable spring force compensates for the weight of the tool, of its feed lines and of the linear element supporting the tool.

13. The system according to claim 1, further comprising an electric distance function generator selected from the group consisting of a potentiometer and a pulse distance emitter, for converting the amount of displacement between the two linear elements into a proportional electric signal, wherein said signal is applied to a motor control circuit to shut down the drive after a defined amount of displacement has been reached.

14. The system according to claim 1, further comprising a mechanically actuated contact switch that becomes active with low hysteresis in defined position over the distance of displacement, said contact switch shutting down the drive.

15. The system according to claim 1, further comprising a contactlessly acting electronic switch with low hysteresis that becomes active in a defined position over the distance of displacement, said electronic switch shutting down the drive.

* * * * *